United States Patent
Kashiwagi

(10) Patent No.: US 7,597,351 B2
(45) Date of Patent: Oct. 6, 2009

(54) SIDE AIRBAG APPARATUS, MOTOR VEHICLE SEAT, AND GAS DISTRIBUTOR OF INFLATOR

(75) Inventor: Daisuke Kashiwagi, Tokyo (JP)

(73) Assignee: Takata Corporation, Tokyo (JP)

(*) Notice: Subject to any disclaimer, the term of this patent is extended or adjusted under 35 U.S.C. 154(b) by 145 days.

(21) Appl. No.: 11/806,549

(22) Filed: Jun. 1, 2007

(65) Prior Publication Data

US 2007/0284862 A1 Dec. 13, 2007

(30) Foreign Application Priority Data

Jun. 12, 2006 (JP) ............... 2006-161746
May 10, 2007 (JP) ............... 2007-125458

(51) Int. Cl.
*B60R 21/207* (2006.01)
*B60R 21/26* (2006.01)

(52) U.S. Cl. ............ 280/730.2; 280/736; 280/740; 280/742

(58) Field of Classification Search ............ 280/729, 280/730.2, 736, 740, 742
See application file for complete search history.

(56) References Cited

U.S. PATENT DOCUMENTS

| | | | |
|---|---|---|---|
| 6,293,581 B1 * | 9/2001 | Saita et al. ............ | 280/730.2 |
| 6,299,200 B1 * | 10/2001 | Bowers et al. ............ | 280/730.2 |
| 6,749,216 B2 * | 6/2004 | Tanase et al. ............ | 280/730.2 |
| 6,802,529 B2 * | 10/2004 | Takedomi et al. ............ | 280/729 |
| 2003/0168836 A1 | 9/2003 | Sato et al. | |
| 2003/0234525 A1 * | 12/2003 | Igawa ............ | 280/736 |
| 2004/0075254 A1 | 4/2004 | Honda | |
| 2005/0248132 A1 | 11/2005 | Wheelwright | |
| 2006/0038386 A1 | 2/2006 | Shibayama et al. | |

FOREIGN PATENT DOCUMENTS

| | | |
|---|---|---|
| DE | 202 16 611 U1 | 1/2003 |
| DE | 20 2004 016 975 U1 | 2/2005 |
| JP | 2005-225351 | 8/2005 |

* cited by examiner

*Primary Examiner*—Ruth Ilan
*Assistant Examiner*—Keith Frisby
(74) *Attorney, Agent, or Firm*—Manabu Kanesaka

(57) ABSTRACT

A side airbag apparatus includes a side airbag having a plurality of partitioned chambers therein to be inflated and deployed in a space between a side wall portion of a body of a motor vehicle and an occupant seated on a seat disposed inside the body. An inflator has an approximately cylindrical shape and blows gas out for inflating and deploying the side airbag from one side in a longitudinal direction of the inflator. A cylindrical member is disposed in a manner so as to cover the one side in the longitudinal direction of the inflator and has a squeezing portion for restricting a flow path of the gas blown out from the inflator.

11 Claims, 7 Drawing Sheets

SIDE AIRBAG APPARATUS, MOTOR VEHICLE SEAT, AND GAS DISTRIBUTOR OF INFLATOR

BACKGROUND OF THE INVENTION AND RELATED ART STATEMENT

The present invention relates to a side airbag apparatus for restraining an occupant in the event of a side collision or the like in a motor vehicle such as an automobile or the like, and more particularly, to a side airbag apparatus including a side airbag inside of which is partitioned into a plurality of chambers, a motor vehicle seat including the same, and a gas distributor of an inflator.

A side airbag apparatus is known for restraining an occupant's body by inflating a side airbag toward a side portion of the occupant by means of an inflator in the event a side collision, a rollover or the like of a motor vehicle such as an automobile. The side airbag apparatus is housed in, for example, a seat back portion of a seat. The side airbag is inflated and deployed into a space between the occupant and a side wall portion of the vehicle body from the seat back portion by means of the gas blown out of the inflator in the side collision or the like.

In such a side airbag, there is an airbag including a plurality of chambers therein, such as that partitioned into two chambers of, for example, an upper chamber for receiving a chest portion, and a lower chamber for receiving a waist portion in an upper half of the body of the occupant, or the like. In an airbag having a construction as described above, there is sometimes a case where a pressure ratio of each of the chambers during inflation and deployment is adjusted, namely for example, the pressure of the upper chamber for receiving the chest portion that is weak against a shock from outside is reduced to be lower than the pressure of the lower chamber for receiving the waist portion, or a case where a deploying condition of each of the chambers during inflation and deployment is varied, namely a chamber of one side is inflated earlier than the chamber of the other side. In such cases, it is required to adjust a flowing amount of the gas supplied from the inflator to each of the chambers.

For example, a side airbag apparatus described in Japanese Unexamined Patent Application Publication No. 2003-335210, shown in FIG. 5 is known as a side airbag apparatus having a flowing amount adjusting device for the gas as describe above. In this technology, a plurality of blowing-out holes (induction holes) for blowing out the gas toward each chamber (partitioned chamber) is provided in a cover for covering a periphery of the inflator, and opening areas of these blowing-out holes are adjusted at each chamber. Therefore, the flowing amount of the gas supplied from the inflator to each chamber can be adjusted.

In the aforementioned technology, a cover, which has a plurality of blowing-out holes adjusted at each chamber, is provided such that a periphery of an inflator is covered. Therefore, the flowing amount of the gas supplied from the inflator to each chamber is adjusted. Accordingly, a structure of the cover is complicated, and it is required that the periphery of the inflator is covered. As a result, the size of the cover becomes large, and a fixing structure of the cover or the like can be complicated as well.

An object of the present invention is to provide a side airbag apparatus capable of adjusting the flowing amount of the gas supplied from the inflator to each chamber with simple structure, a motor vehicle seat provided with the side airbag apparatus, and a gas distributor of the inflator.

Further objects and advantages of the invention will be apparent from the following description of the invention.

SUMMARY OF THE INVENTION

To achieve the above-described object, in the first aspect of the invention, the side airbag apparatus includes a side airbag having a plurality of partitioned chambers therein, and it is inflated and deployed in a space between a side wall portion of a body of a motor vehicle and an occupant seated on a seat disposed inside the body. An inflator has approximately a cylindrical shape and blows gas for inflating and deploying the side airbag from one side in a longitudinal direction of the inflator. A cylindrically shaped member has a squeezing portion for squeezing a flow path of the gas blown out from the inflator, while being disposed in a manner so as to cover the one side in the longitudinal direction of the inflator.

In an emergency such as a side collision of the motor vehicle or the like, the inflator is activated and the gas blown out from the inflator is supplied to the plurality of chambers, and thereby the side airbag is inflated and deployed in a space between the occupant and the side wall portion of the body of the motor vehicle.

In the first aspect of the invention, the flow path of the gas blown out from the inflator is squeezed by means of the squeezing portion of the cylindrically shaped member disposed in a manner so as to cover the one side, where the gas is blown out, in the longitudinal direction. Therefore, the flowing amount of the gas supplied from the inflator to a specific chamber of the plurality of chambers can be adjusted. As a result, it becomes possible to adjust a pressure ratio of each of the chambers during inflation and deployment, or to change a deploying condition of each of the chambers during inflation and deployment.

Thus, according to the first aspect of the invention, the flowing amount of the gas supplied from the inflator to each of the chambers can be adjusted with simple construction where a cylindrically shaped member is provided at one side in the longitudinal direction of the inflator. Further, as a result of that the flowing amount can be adjusted with such a simple construction as that described above, it is possible for a construction to adjust the gas-flowing amount to each of the chambers by later attaching the cylindrically shaped member to the existing side airbag apparatus which is not equipped with a flowing amount adjusting device.

As to the second aspect of the invention, in the aforementioned first aspect of the invention, the squeezing portion is a ring-shaped member provided at an end portion of the one side in the cylinder axis direction of the cylindrically shaped member.

In the second aspect of the invention, the flowing amount of the gas is adjusted by squeezing the flow path of the gas blown out from the one side in the longitudinal direction of the inflator with a ring-shaped member of the cylindrically shaped member. Since the flowing amount of the gas can be adjusted to a desired value by adjusting an opening area of the ring-shaped member, the gas-flowing amount can be adjusted with simpler construction, compared to a construction, for example, where the gas-flowing amount supplied from the inflator to each chamber is adjusted by adjusting the opening area of a plurality of blowing-out holes, which is provided on a cover for the inflator, at each of the chambers.

The third aspect of the invention is that, in the aforementioned second aspect of the invention, an inner diameter of the cylindrically shaped member is set to be greater than an outer diameter of the inflator at a predetermined value so that a flow path of the gas is formed in a space between an inner peripheral surface of the cylindrically shaped member and an outer peripheral surface of the inflator.

In the third aspect of the present invention, the inner diameter of the cylindrically shaped member is set to be greater than the outer diameter of the inflator at the predetermined value so that the flow path of the gas is formed in a space between the inner peripheral surface of the cylindrically shaped member and the outer peripheral surface of the inflator. Therefore, it becomes possible to distribute the gas blown out from the inflator to a flow path passing through the squeezing portion at one side in the cylinder axis direction, and to a flow path passing through a space between the inner peripheral surface of the cylindrically shaped member and the outer peripheral surface of the inflator at the other side by means of the cylindrically shaped member. In addition, as for the flow path connecting to the one side in the cylinder axis direction, it becomes possible to adjust the flowing amount of the gas by squeezing the flow path with the squeezing portion. In a manner as described above, a construction for adjusting the flowing amount of the gas by distributing a flow path of gas and squeezing one of the flow paths can be obtained by a simple construction.

The fourth aspect of the invention is that, in the aforementioned third aspect of the invention, the cylindrically shaped member includes an engaging portion to be engaged with the inflator.

In the fourth aspect of the invention, the cylindrically shaped member is engaged with the inflator using the engaging portion. Therefore, the cylindrically shaped member can be installed by the engaging portion with, for example, a bolt or the like for fixing the inflator to the motor vehicle side. Therefore, there is no need to separately provide a fixing member for fixing the cylindrically shaped member to the motor vehicle side, and a fixing structure can be simplified accordingly. Further, because the fixing member for the cylindrically shaped member is not necessary, a construction capable of adjusting the gas-flowing amount to each of the chambers can be easily obtained with a simple construction by later attaching the cylindrically shaped member to the existing side airbag apparatus which is not equipped with a flowing amount adjusting device.

The fifth aspect of the invention is that, in the aforementioned fourth aspect of the invention, the engaging portion is provided in a manner so as to face the end portion of the other side in the longitudinal direction of the inflator, and the engaging portion includes a hooking portion capable of contacting the end portion of the other side in the longitudinal direction of the inflator when the gas of the inflator is blown out.

In the fifth aspect of the invention, the engaging portion includes the hooking portion provided in a manner so as to face the end portion of the other side in the longitudinal direction of the inflator. The hooking portion has a structure capable of contacting the end portion of the other side in the longitudinal direction of the inflator when the gas of the inflator is blown out. Therefore, the cylindrical member can be hooked to the inflator, and the cylindrically shaped member can be prevented from being dropped off or displaced from the inflator due to propulsion generated by a blowing-out operation of the gas. As a result, an adjusting function of the cylindrical member can be stabilized.

The sixth aspect of the invention is that it includes a cylindrically shaped base cloth member provided at an outer periphery side of the cylindrically shaped member in any one of the aforementioned first to fifth aspects of the invention.

In the sixth aspect of the invention, a cylindrically shaped base cloth is provided at the outer periphery side of the cylindrically shaped member. Therefore, it becomes possible to cover the outer periphery side of the squeezing portion of the cylindrically shaped member with the base cloth member. Accordingly, the high-temperature gas blown out from the inflator through the squeezing portion of the cylindrically shaped member is avoided to blow out from the squeezing portion to a surrounding area and to directly blow the base cloth constituting the side airbag. Thus, a deterioration of the base cloth due to the high-temperature gas can be reduced.

The seventh aspect of the invention is that, in any one of the aforementioned first to sixth aspects of the invention, the side airbag is formed into a bag shape by joining at least two sheets of base cloths with a stitching work, and the side airbag includes a fitting portion inside the side airbag to fit on the cylindrically shaped member, being formed into a passageway like shape, so that an inner diameter of the fitting portion is formed to be approximately equal to an outer diameter of the cylindrically shaped member by stitching both sides of the fitting portion.

In the seventh aspect of the invention, the fitting portion for fitting on the cylindrically shaped member is formed inside the side airbag by stitching both sides. Therefore, the cylindrically shaped member can be easily attached to the side airbag by fitting to the fitting portion. Further, since the inner diameter of the fitting portion is formed to be approximately equal to the outer diameter of the cylindrically shaped member, the cylindrically shaped member can be firmly attached to the side airbag by an interference fit, and favorable airtightness of a clearance between an outer peripheral surface of the cylindrically shaped member and an inner peripheral surface of the fitting portion can be secured.

The eighth aspect of the invention is that, in the aforementioned seventh aspect of the invention, the side airbag includes a ring-shaped stitching portion where the base cloth is stitched into approximately circular ring shape at least at one side of the fitting portion.

In the eighth aspect of the invention, a fitting portion is formed by providing the ring-shaped stitching portion where the base cloth is stitched into approximately circular ring shape at least at one side. Therefore, a construction can be made such that the inner diameter at a top portion of the ring-shaped stitching portion is approximately equal to the outer diameter of the cylindrically shaped member. Therefore, friction at an inserting time can be reduced in comparison to a case where a fitting portion is formed such that both sides thereof are stitched into a straight line shape and the inner diameter thereof is formed to be approximately equal to the outer diameter of the cylindrically shaped member, and the cylindrically shaped member is inserted into the fitting portion. This enables to improve an attaching property of the cylindrically shaped member to the fitting portion.

So as to achieve the aforementioned object, the ninth aspect of the invention is that a motor vehicle seat includes the side airbag apparatus according to any one of the aforementioned first to eighth aspects of the invention.

So as to achieve the aforementioned object, the tenth aspect of the invention is that a gas distributor of an inflator distributes a gas-flow path of the approximately cylindrically shaped inflator for blowing out gas from one side in a longitudinal direction of the inflator for inflating and deploying a side airbag. The side airbag includes a plurality of partitioned chambers inside the side airbag and is inflated and deployed in a space between a side wall portion of a body of a motor vehicle and an occupant seated on a seat disposed inside the body. The gas distributor of the inflator is a cylindrically shaped member having a squeezing portion for squeezing the flow path of the gas blown out from the inflator, and is disposed in a manner so as to cover the one side in the longitudinal direction of the inflator.

In an emergency such as a side collision of the motor vehicle or the like, the inflator is activated, and the side airbag is inflated and deployed in a space between the occupant and the side wall portion of the body of the motor vehicle so that the gas blown out from the inflator is distributed by means of the gas distributor and supplied into a plurality of chambers.

In the tenth aspect of the invention, the flow path of the gas blown out from the inflator is squeezed by means of the squeezing portion of the gas distributor that is the cylindrically shaped member disposed in a manner so as to cover the one side in the longitudinal direction that is a gas-blowing out side of the inflator. Therefore, the flowing amount of the gas supplied to a specific chamber of the plurality of chambers from the inflator can be adjusted. As a result, it becomes possible to adjust a pressure ratio of each of the chambers during inflation and deployment, or to change a deploying condition of each chamber during inflation and deployment individually.

As described above, according to the tenth aspect of the invention, the flowing amount of the gas supplied from the inflator to each of the chambers can be adjusted with a simple construction where the gas distributor, the cylindrically shaped member having the squeezing portion at the one side in the longitudinal direction of the inflator, is provided. Further, as a result of that the flowing amount is adjusted with such a simple construction, a construction capable of adjusting the flowing amount of the gas to each of the chambers can be easily obtained by later attaching the gas distributor for an existing side airbag apparatus which is not equipped with a flowing amount adjusting device.

The eleventh aspect of the invention is that in the aforementioned tenth aspect of the invention, the cylindrically shaped member includes the engaging portion to be engaged with the inflator.

In the eleventh aspect of the, the cylindrically shaped member is engaged with the inflator through the engaging portion. Therefore, for example, it becomes possible to install the cylindrically shaped member by engaging the engaging portion with the bolt or the like for fixing the inflator to a motor vehicle side. Therefore, there is no need to separately provide a fixing member for fixing the cylindrically shaped member to the motor vehicle side, and the fixing structure can be simplified. Further, since a fixing member for the cylindrically shaped member is not necessary, it becomes possible to form a construction capable of adjusting the flowing amount of the gas flowing into each of the chambers with a simple construction by subsequently attaching the cylindrically shaped member to the existing side airbag apparatus having no flowing amount adjusting device.

The twelfth aspect of the invention is that, in the aforementioned eleventh aspect of the invention, the engaging portion is provided in a manner so as to face the end portion of the other side in the longitudinal direction of the inflator, and the engaging portion includes a hooking portion capable of contacting the end portion of the other side in the longitudinal direction of the inflator when the gas of the inflator is blown out.

In the twelfth aspect of the invention, the engaging portion of the cylindrically shaped member includes the hooking portion provided in a manner so as to face the end portion of the other side in the longitudinal direction of the inflator. The hooking portion has a structure capable of contacting the end portion of the other side in the longitudinal direction of the inflator when the gas of the inflator is blown out. Therefore, the cylindrically shaped member can be hooked to the inflator, and the cylindrically shaped member can be prevented from being dropped off or displaced from the inflator due to the propulsion of the blowing-out operation of the gas. As a result, the adjusting function of the cylindrically shaped member for adjusting the flowing amount of the gas can be stabilized.

According to the present invention, a flowing amount of the gas supplied from an inflator to each chamber can be individually adjusted with a simple construction.

DETAILED DESCRIPTION OF THE EMBODIMENTS

Figure 1A:
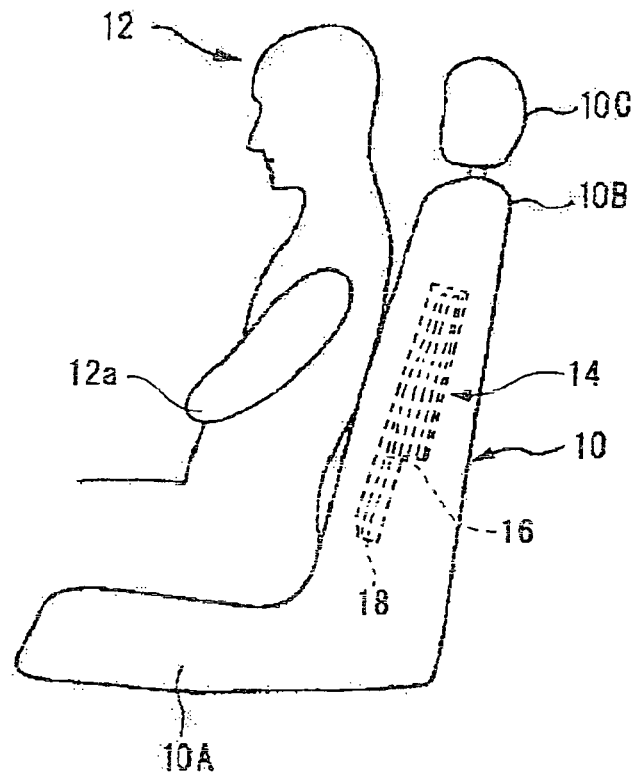
FIGS. 1(a) and 1(b) are schematic side views illustrating an automobile seat provided with a first embodiment of a side airbag apparatus according to the present invention.
Figure 1B:
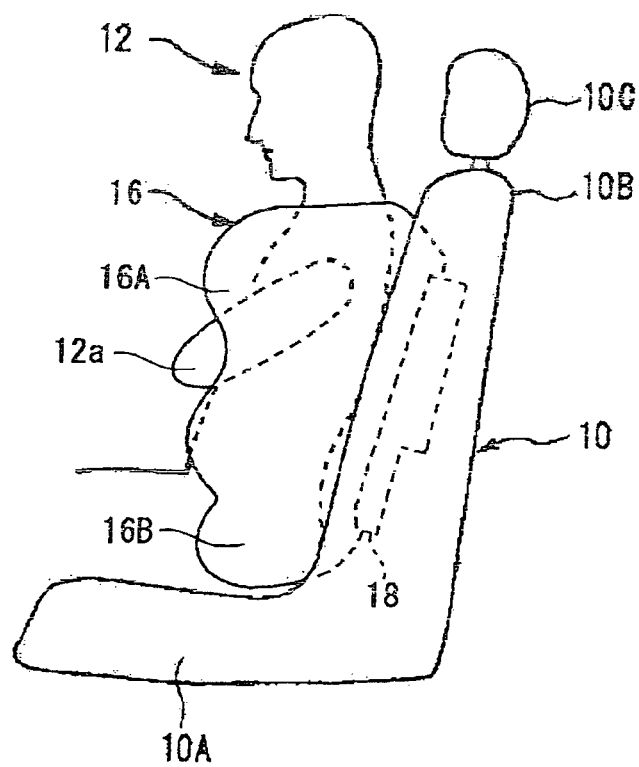

FIGS. 1(a) and 1(b) are schematic side views illustrating an automobile seat provided with an embodiment of the side airbag apparatus according to the present invention, wherein FIG. 1(a) illustrates the side airbag apparatus in an ordinary time and FIG. 1(b) illustrates the side airbag apparatus in an inflated time.

In FIGS. 1(a) and 1(b), an occupant 12 is seated on a seat 10. The seat 10 (motor vehicle seat) includes a seating portion 10A, and a seat back portion 10B protrudes upward from the seating portion 10A. A head rest 10C is attached to a top portion of the seat back portion 10B.

The seat 10 is provided with a side airbag apparatus 14 in the seat back portion 10B for limiting a movement of an upper body of the occupant 12 in the event of the side collision, the rollover of the vehicle body, or the like. The side airbag apparatus 14 is provided with a side airbag 16 inflating and deploying into a space between a side wall portion of the automobile body (not shown, and is positioned at a front side in FIG. 1) and the occupant 12 seated on the seat 10. The side airbag apparatus 14 is also provided with, for example, a resin-made casing 18 in which the side airbag 16 is housed in a folded-back condition. The side airbag apparatus 14 is further provided with approximately cylindrically shaped inflator 20 (refer to FIG. 3 or the like described later) for supplying the gas for inflating and deploying the side airbag 16. The inflator 20 is ignited by an inflator control circuit, not shown.

As shown in FIG. 1(*a*), the side airbag 16 is housed in a seat back portion 10B of the seat 10 in a condition of being folded back into the casing 18. On the other hand, for example, when in a side collision or the like of the automobile, the inflator 20 of the side airbag apparatus 14 is ignited by the inflator control circuit (not shown). As shown in FIG. 1(*b*), the side airbag 16 is inflated and protrudes from the seat 10 (in the present embodiment, while breaking a stitch line, not shown, in fabrics on a front surface of the seat back portion 10B and on a side surface of the seat back portion 10B facing a vehicle body side wall portion) and is deployed into a space between the vehicle body side wall portion of the automobile and the occupant 12. The side airbag 16 includes a first bag portion 16A positioned at an upside, and a second bag portion 16B positioned at a downside. The first bag portion 16A receives a chest portion of the occupant 12 and absorbs a shock, and the second bag portion 16B limits a movement of a waist portion of the occupant 12 in a lateral direction of the vehicle.

Figure 2:
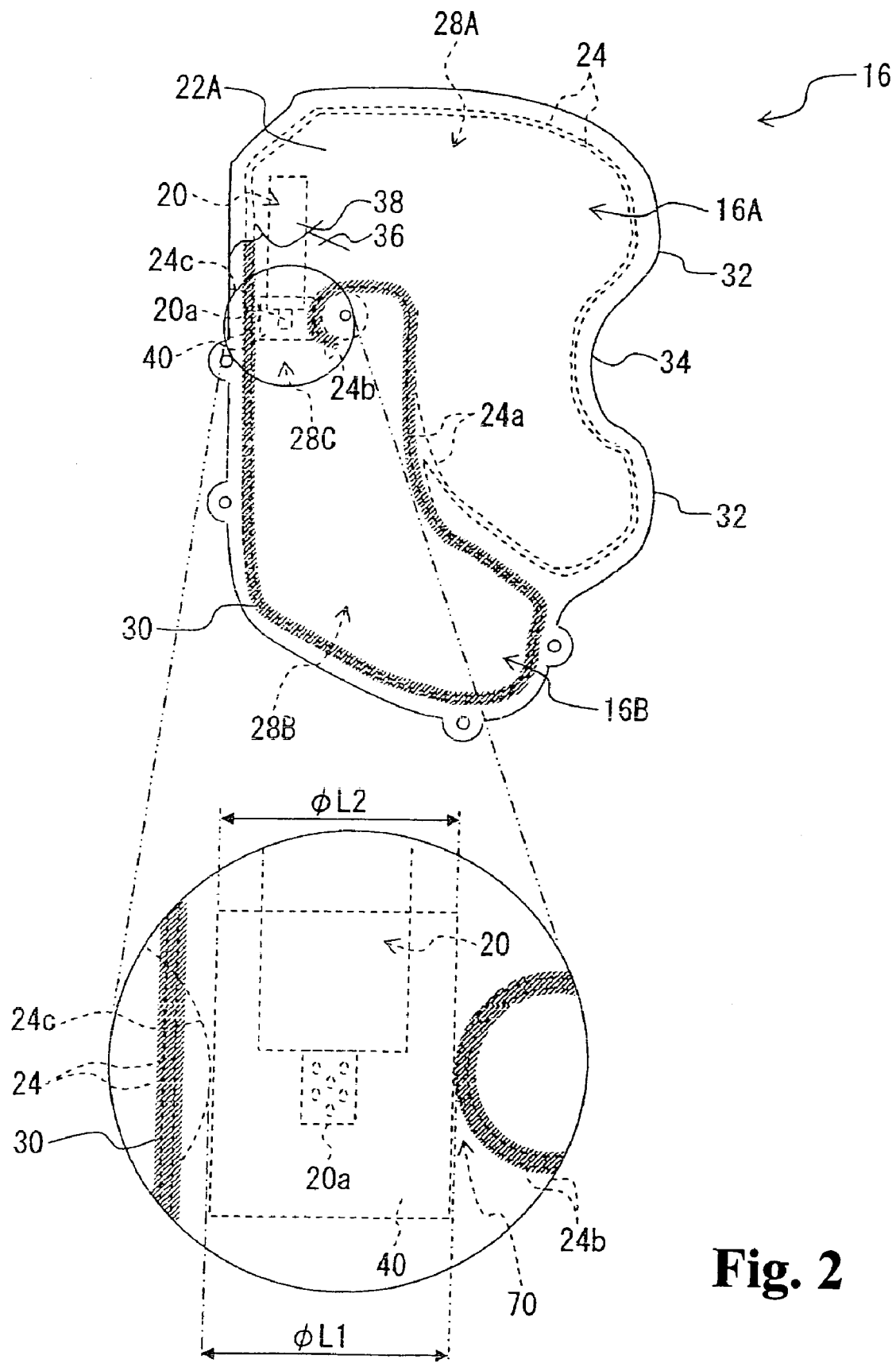
FIG. 2 is a side view illustrating an entire structure and a partially enlarged view in the vicinity of a chamber connecting portion of the first embodiment of the side airbag according to the present invention in an inflated and deployed condition.

FIG. 2 is side view illustrating an entire structure of the side airbag 16 in an inflated and deployed condition, and showing a partially enlarged view in the vicinity of a chamber connecting portion as well.

In FIG. 2, the side airbag 16 is formed to be a bag-shaped body in which a first panel 22A (base cloth) and a second panel 22B (base cloth, not shown in FIG. 2) formed into approximately the same shape are stitched and joined along an entire periphery of an outer edge portion. A numeral 24 in FIG. 2 denotes the stitching-and-joining portion. The stitching-and-joining portions are stitched double at a portion along the outer edge portion of the bag-shaped body (incidentally, not always necessary to be double but also a single stitch may be applicable). The first panel 22A is disposed at one side (for example, the occupant side) in a vehicle width direction, and the second panel 22B is disposed at the other side (for example, a side wall side of the automobile body) in the vehicle width direction. Incidentally, FIG. 2 is a side view looking from one side in the vehicle width direction, and only the first panel 22A is illustrated.

An inside of the side airbag 16 is partitioned into two chambers including a first chamber 28A formed from the upper side to a tip end side in an inflating direction (right side in FIG. 2), and a second chamber 28B formed from a base end side of the inflating direction (left side in FIG. 2) to the lower side. The first chamber 28A and the second chamber 28B are partitioned by a stitching-and-joining portion 24*a* provided toward inner periphery side. However, the first chamber 28A and the second chamber 28B are connected at a chamber connecting portion 28C provided at the base end side of the inflating direction (left side in FIG. 2). The first chamber 28A and the second chamber 28B, having been constructed as mentioned above, are provided in the first bag portion 16A and a second bag portion 16B, respectively.

The chamber connecting portion 28C is formed between a circular stitching portion 24*b* having approximately a circular shape, provided at a tip end portion of the stitching-and-joining portion 24*a*, and a circular stitching portion 24*c* having approximately a circular shape, provided at the base end side of the side airbag 16 (left side in FIG. 2). A sleeve 40 is fitted into a fitting portion 70, where top portions of the respective circular stitching portions 24*b* and 24*c* are opposed (refer to a partially enlarged view in FIG. 2). The top portion of the circular stitching portion 24*c* at the fitting portion 70 side is provided inside (right side, and fitting portion 70 side in FIG. 2) of a sealing member portion 30 described later.

Therefore, it is set so that an inner diameter L1 of the fitting portion 70 is approximately equal to an outer diameter L2 of the sleeve 40 (refer to the partially enlarged view in FIG. 2). Consequently, the sleeve 40 can be firmly attached to the fitting portion 70 by tight fitting, and a good airtightness of a clearance between an outer peripheral surface of the sleeve 40 and an inner peripheral surface of the fitting portion 70 can be obtained. (In detail, although a heat cloth 56, described later, intervenes between the outer peripheral surface of the sleeve 40 and the inner peripheral surface of the fitting portion 70, a thickness of the heat cloth 56 made of a base cloth is small, and therefore the description is omitted here.)

Further, by forming a construction to provide a circular stitching portion at both sides (it can be just one side) of the fitting portion 70 as in the present embodiment, the construction can be formed to have an inner diameter of the circular stitching portion at the top portion to be approximately identical to the outer diameter of the sleeve 40. Therefore, the inserting friction can be reduced and an attaching property of the sleeve 40 to the fitting portion can be improved in comparison to a case where a fitting portion is formed such that both sides thereof are stitched into a straight line shape, and the inner diameter thereof is approximately identical to the outer diameter of the sleeve 40, and the sleeve 40 is inserted into the fitting portion.

The sleeve 40, inserted into the fitting portion 70, is provided on the side of a convex portion 20*a* that discharges the gas of the inflator 20. The sleeve 40 is provided with a flowing amount distributing function for distributing the gas blown out from the convex portion 20*a* into the first and second chambers 28A and 28B at a predetermined flowing amount ratio (described later in detail).

In the stitching-and-joining portion 24, at a portion constituting an outer edge of the second chamber 28B (namely, a portion starting from a base end side of the chamber connecting portion 28C of the inflating direction to a tip end of the stitching-and-joining portion 24*a* which is provided toward an inner periphery side, while running the lower side of the side airbag 16), a sealing member portion 30, formed from an appropriate sealing material such as silicone rubber or the like, is provided along the stitching-and-joining portion 24 so as to seal the stitching-and-joining portion 24. The sealing member portion 30 is provided to have a wider width than the double stitching-and-joining portion 24 so that the stitching-and-joining portion 24 provided in double can be sealed (refer to the partially enlarged view in FIG. 2). Therefore, the airtightness of the second bag portion 16B having the second chamber 28B can be improved, and the pressure in the second bag portion 16B for limiting the movement of the waist portion of the occupant 12 can stay at relatively high pressure for relatively long time.

The side airbag 16 (in detail, the first bag portion 16A) is provided with a concave portion 34 having approximately arc shape at a position in a bag outer edge portion 32 at a tip end side of the inflating direction thereof (right side in FIG. 2), corresponding to an elbow portion 12*a* of the occupant 12 (refer to FIG. 1(*b*)). The concave portion 34 is formed by stitching and joining the first and second panels 22A and 22B, previously prepared, and subsequently forming a bag shape, so that a concave portion is formed at a corresponding position in the outer edge portion.

The first panel 22A is provided with a slit, not shown, for inserting the inflator 20 and the sleeve 40 into the side airbag 16. The first panel 22A is also provided with a cover portion 36 for covering the slit from one side (downside in FIG. 2), and a cover portion 38 for covering the slit from the other side (upside in FIG. 2). These cover portions 36 and 38 are constructed with part of appropriate filler cloth that is integrally provided by stitching work at the front face of the first panel 22A. The airtightness of the side airbag 16 can be improved by folding back the covering members 36 and 38 and covering the slit by the folded covering members, after inserting the inflator 20 and the sleeve 40 via the slit.

Figure 3:
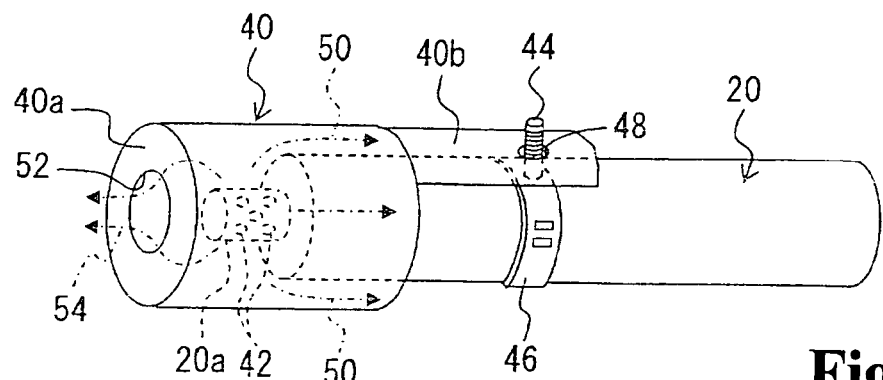
FIG. 3 is a perspective view illustrating an entire structure of a sleeve provided in an inflator.

FIG. 3 is a perspective view illustrating an entire structure of the sleeve 40 that is provided in the inflator 20.

In FIG. 3, the sleeve 40 is a cylinder member (in the present embodiment, a circular cylindrically shaped member) having a squeezing portion 40a at an end portion of one side in a cylinder axis direction (left side in FIG. 3, i.e., the second chamber 28B side), and a tongue piece portion 40b (engaging portion) for hooking the sleeve 40 on the inflator 20, at the other side in the cylinder axis direction (right side in FIG. 3, i.e., first chamber 28A side). On the other hand, the inflator 20 has the aforementioned convex portion 20a at one side thereof (left side in FIG. 3, i.e., the second chamber 28B side). A plurality of blowing-out holes 42 for blowing out the gas is provided in the convex portion 20a. The inflator 20 is supported by a clip 46 having a bolt 44, and the inflator 20 is fixed to the casing 18 by the bolt 44 on the casing 18.

A hole 48 for the bolt 44 of the clip 46 to be inserted is provided in the tongue piece portion 40b of the sleeve 40. By the bolt 44, inserted into the hole 48, the sleeve 40 is engaged with the inflator 20 and covers one side of the inflator 20 (left side in FIG. 3, i.e., the second chamber 28B side). Incidentally, an inner diameter of the sleeve 40 is formed to be greater than an outer diameter of the inflator 20 at a predetermined value, and a clearance of a flow path (indicated by an arrow 50 in FIG. 3) where the blown out gas flows toward a first chamber 28A side is formed between an inner peripheral surface of the sleeve 40 and an outer peripheral surface of the inflator 20.

Further, the squeezing portion 40a of the sleeve 40 is a ring-shaped member having an opening 52 (a circular ring member in the present embodiment). A bore diameter of the opening 52 is set to a previously calculated appropriate value so as for the blown out gas of the inflator 20 to be distributed to the first chamber 28A of the first bag portion 16A and the second chamber 28B of the second bag 16B at an appropriate flowing amount ratio. This is for the first bag portion 16A and the second bag portion 16B constituting the side airbag 16 to perform a desired deploying action, or for the pressures in the first bag portion 16A and the second bag portion 16B to become desired values, respectively.

In the present embodiment, the bore diameter of the opening 52 is set such that the pressure in the second bag portion 16B that limits the waist portion of the occupant 12 becomes higher than the pressure in the first bag portion 16A that limits the chest portion. For example, the opening diameter is set to be from 15 to 25 mm when the inflator diameter is 25 mm and the sleeve diameter is from 30 to 35 mm. Incidentally, the opening diameter is not limited to the value described above, and is set to an appropriate value corresponding to a capacity of the first chamber 28A and that of second chamber 28B, or the like. Therefore, the gas blown out from the inflator 20 can be controlled to a predetermined flowing amount, and supplied to the second chamber 28B side. The flow path is indicated by an arrow 54 in FIG. 3.

Figure 4A:
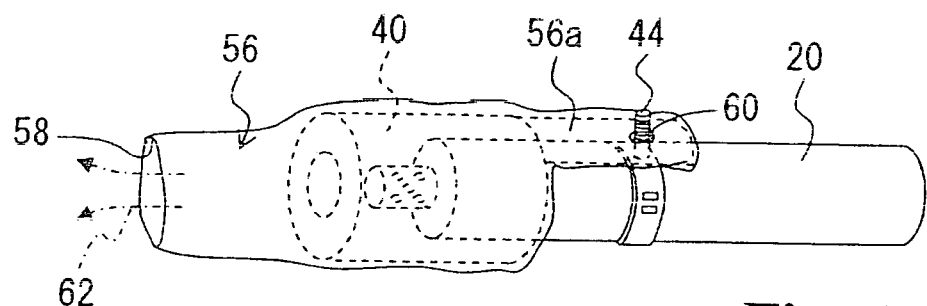
FIGS. 4(a) and 4(b) are perspective views illustrating an entire structure of a heat cloth.
Figure 4B:
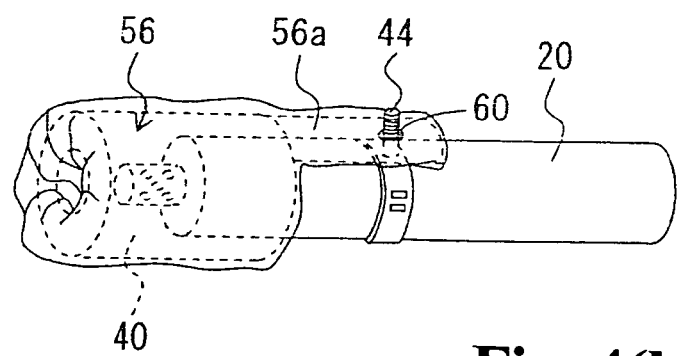

The sleeve 40, having the aforementioned construction, is attached to the chamber connecting portion 28C in a condition of being covered with the heat cloth 56. FIGS. 4(a) and 4(b) are perspective views illustrating an entire structure of the heat cloth 56, in which FIG. 4(a) illustrates a condition of a halfway of inflation and deployment of the side airbag 16, and FIG. 4(b) illustrates a condition after completion of the inflation and deployment.

In FIGS. 4(a) and 4(b), the heat cloth 56 is a cylindrically shaped base cloth member having an opening 58 at one side (left side in FIG. 4, i.e., the second chamber 28B side), and a tongue piece portion 56a at the other side (right side in FIG. 4, i.e., the first chamber 28A side) is for hooking the heat cloth 56 on the inflator 20. A length of the heat cloth 56 in the cylinder axis direction is configured to be greater than that of the sleeve 40, and the heat cloth 56 is provided at an outer periphery side of the sleeve 40 as shown in FIGS. 4(a) and 4(b). A hole 60 for the bolt 44 of the aforementioned clip 46 to be passed through is provided in the tongue piece portion 56a. By the bolt 44 passing through the hole 60, the heat cloth 56 is hooked on one side of the inflator 20 (left side in FIG. 4, i.e., the second chamber 28B side) in a condition of covering the sleeve 40.

As shown in FIG. 4(a), in a halfway of inflation and deployment of the side airbag 16, the heat cloth 56 is fully stretched by the gas blown out from the inflator 20 via the opening 52 of the sleeve 40. The gas is supplied into the second chamber 28B from the opening 58 at a tip end of one side of the heat cloth 56 as indicated by an arrow 62 in FIG. 4(a). Therefore, the high temperature gas, blown out from the inflator 20 toward the chamber 28B side, is avoided to blow out from the opening 52 of the squeezing portion 40a of the sleeve 40 to a surrounding area and directly blow the first and second panels 22A and 22B. This reduces a deterioration of the base cloth and stitches due to the high temperature gas.

FIG. 4(b) illustrates a condition after the inflation and deployment of the side airbag 16 are complete. In general, for improvement of safety, the pressure of a portion for limiting the waist portion is set to be greater than that of the chest portion in a side airbag having a plurality of portions for receiving a chest portion and the waist portion of the occupant as in the present embodiment. Accordingly, it is preferable to prevent the gas from blowing back to the chest portion side from the waist portion side after completing the inflation and deployment of the airbag. In the present embodiment, when the gas is about to blow back from the second chamber 28B side to the first chamber 28A side via the chamber connecting portion 28C after the inflation and deployment of the side airbag 16 is completed, the opening 52 of the sleeve 40 is blocked by the heat cloth 56 which is folded back, as shown in FIG. 4(b). Therefore, the gas is avoided to blow back from the second chamber 28B to the first chamber 28A and the pressure in the second bag portion 16B can stay at relatively high pressure for relatively long time.

FIGS. 5(a) to 5(f) are views explaining the way how to fold back the side airbag 16 when being housed in the casing 18, described earlier. Incidentally, a condition of the side airbag 16 at the angle of the second panel 22B side is shown here.

Figure 5A:
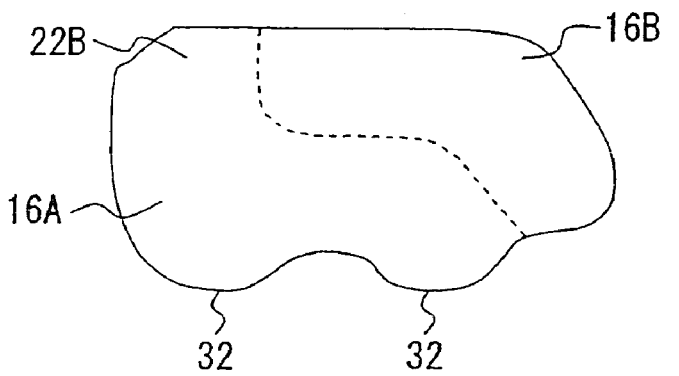
FIGS. 5(a) to 5(f) are views explaining the way how to fold the side airbag when the same is housed in a casing.
Figure 5B:
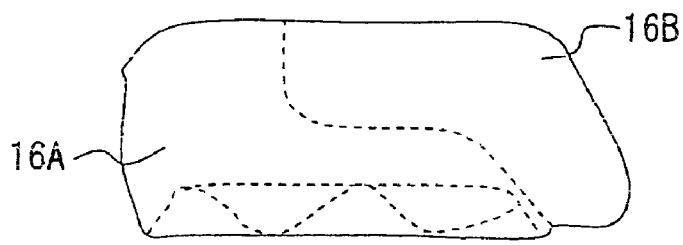
Figure 5C:
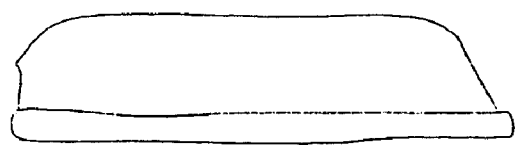
Figure 5D:
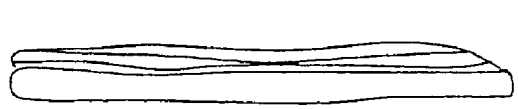
Figure 5E:
Figure 5F:

Firstly, a so-called "inward folding" is performed in which the above-described bag outer edge portion 32 at a tip end side of the inflating direction (downside in FIG. 5(a)) is tucked into an inside in a manner so as to tuck into a space between the first panel 22A and the second panel 22B from a condition that the side bag 16 is flatly spread (a condition shown in FIG. 5(a)). In the present embodiment, the inward folding is performed only for the first bag portion 16A. Therefore, the tip end side of the inflating direction (downside in FIG. 5) of the side airbag 16 is formed to be approximately flat or linear shape (a condition shown in FIG. 5(b)).

Then, a so-called "roll-folding" is performed in which the side airbag 16 is folded while rolling up into a roll-shape from the tip end side of the inflating direction (downside in FIG. 5)

of the approximately flat shaped side airbag 16 toward a base end side of the inflating direction (upside in FIG. 5(*a*)) (a condition shown in FIG. 5(*c*)). A diameter of the roll and a number of times of performing the roll-folding at this moment is approximately set corresponding to a size of the airbag, a size of the casing where the airbag is housed, or the like. However, in the present embodiment, for example, a first roll width is set to be 23 mm, and a number of folding times is set to be 3 times.

Next, a so-called "accordion-fold" is performed in which the rest part of the base end side of the side airbag 16 in the inflating direction, (upside in FIG. 5(*a*)) is folded in an accordion-like manner by alternatively performing a mountain-fold and a valley-fold. Therefore, the side airbag 16 is folded back into a rod-shape (a condition shown in FIG. 5(*d*)). Thereafter, the rod-shaped side airbag 16 is folded toward one side (downside in the drawing here) so as to reduce a size in a length direction (a condition shown in FIG. 5(*e*)), and further, the folded portion is entirely folded toward the other side (upside in the drawing here) (a condition shown in FIG. 5(*f*)). In this condition, the side airbag 16 is housed in the casing 18.

Figure 6:
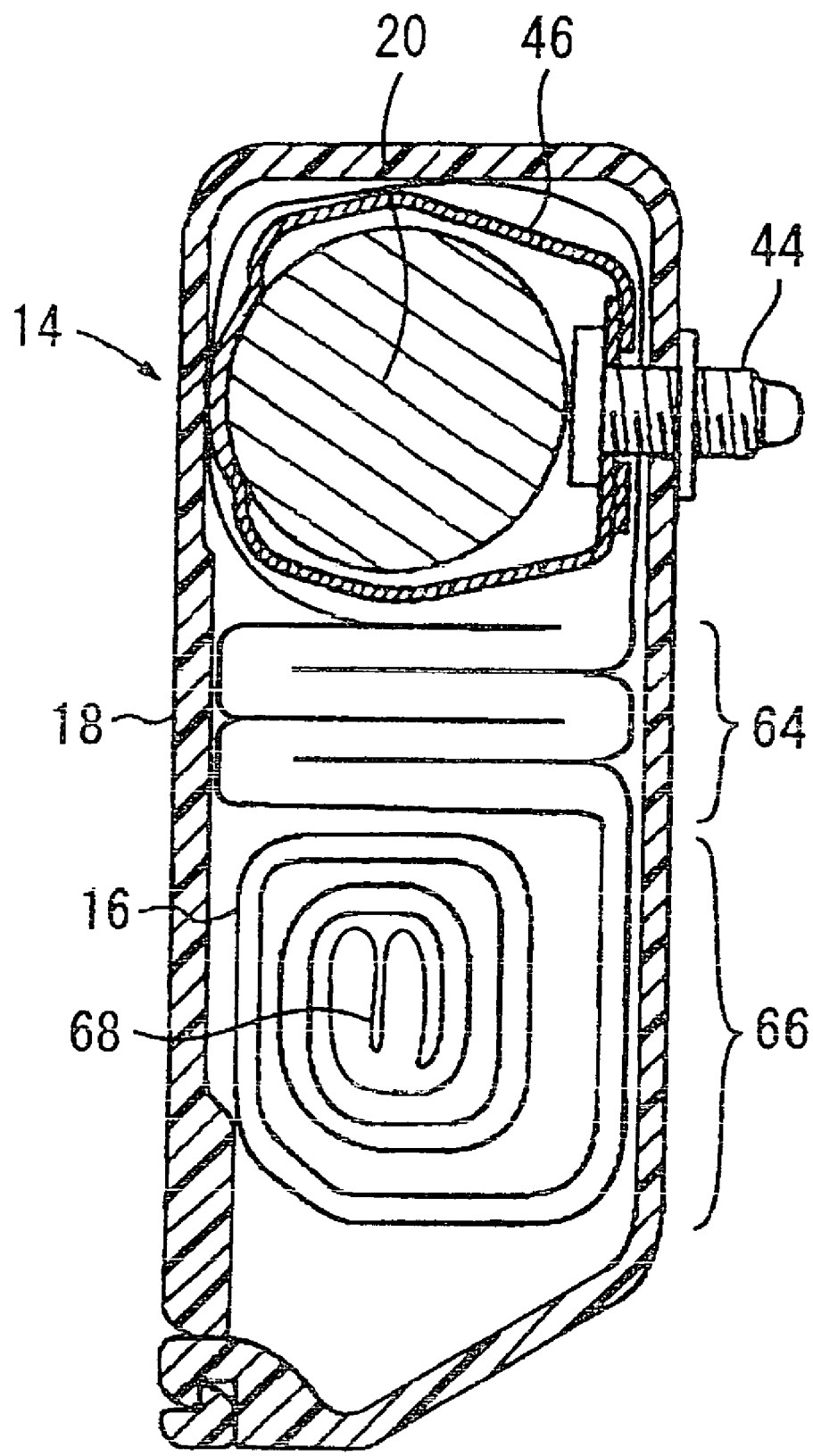
FIG. 6 is a cross-sectional view illustrating the casing showing a condition where the folded-back side airbag is housed in the casing.

FIG. 6 is a cross-sectional view showing a casing 18 illustrating a condition, in which the side airbag 16 being folded back in a manner as described above is housed in the casing 18.

As shown in FIG. 6, by the bolt 44, provided in the above-described clip 46, being fastened to the casing 18, the inflator 20 is fixed to the casing 18. Further, an end portion of the base end side of the inflating direction of the side airbag 16 (upside in FIG. 6) is fixed by being sandwiched between the clip 46 and the casing 18. Furthermore, as described above, the side airbag 16 is folded into the accordion-like folding (the part denoted by a numeral 64 in the drawing) at the base end side in the inflating direction, folded into the roll-folding (the part denoted by a numeral 66 in the drawing) at the tip end side in the inflating direction (downside in FIG. 6), and folded into the inward-folding (the part denoted by a numeral 68 in the drawing) at the tip end in the inflating direction. The side airbag 16 is housed in the casing 18 in the above-described condition.

In the automobile where the side airbag apparatus 14 having the construction described above is mounted, various types of sensors are provided for detecting (or prediction for the occurrence) of the collision (including the side collision or the like) or the rollover. Moreover, in an emergency of the side collision or the like, these sensors detect the emergency, and an inflator control circuit starts up an initiator of an inflator 12 based on a detecting signal from these sensors. Therefore, the inflator 20 is started up and the gas for inflating the airbag is blown out. The side airbag 16 is inflated and deployed in a space between the side wall portion of the automobile body and the occupant 12.

According to the side airbag apparatus 14 of the present embodiment having a construction and performing an operation explained above, following advantages are obtained.

Namely, in the present embodiment, the flow path of the gas blown out from the inflator 20 is squeezed by the squeezing portion 40*a* of the sleeve 40 that is disposed in a manner such that one side in a longitudinal direction, which serves as the gas-blowing out side of the inflator 20, is covered. Therefore, a flowing amount of the gas supplied from the inflator 20 to the second chamber 28B can be adjusted. As a result, it becomes possible to adjust a pressure ratio of the first chamber 28A and the second chamber 28B during inflation and deployment, or to change the deploying action of the first chamber 28A and the second chamber 28B during inflation and deployment individually.

As described above, in the present embodiment, the flowing amount of the gas supplied from the inflator 20 to the first chamber 28A and the second chamber 28B can be adjusted with a simple structure where the sleeve 40 is provided at one side in the longitudinal direction of the inflator 20. Further, as a result of that the flowing amount can be adjusted with such a simple construction, a construction, capable of adjusting the flowing amount of the gas to each of the chambers, can be easily obtained by later attaching the sleeve to an existing side airbag apparatus which is not equipped with a flowing amount adjusting device.

Furthermore, in the present embodiment, specifically, the flowing amount of the gas is adjusted by squeezing the flow path of the gas blown out from one side in the longitudinal direction of the inflator 20 with the squeezing portion 40*a* serving as a ring-shaped member of the sleeve 40. At this moment, since the flowing amount of the gas can be adjusted to a desired amount by adjusting an opening 52 area of the ring-shaped member, the gas-flowing amount of the gas can be adjusted with simpler construction compared to a construction where the gas-flowing amount supplied from the inflator to each chamber is adjusted by adjusting the opening area of the blowing-out holes on a cover of the inflator at each of the chambers.

Moreover, in the present embodiment, specifically, the inner diameter of the sleeve 40 is set to be greater than the outer diameter of the inflator 20 by a predetermined value so that the flow path of the gas is formed in between the inner peripheral surface of the sleeve 40 and the outer peripheral surface of the inflator 20. Therefore, the gas blown out from the inflator 20 is distributed by the sleeve 40 to a flow path passing through the squeezing portion 40*a* at one side in the cylinder axis direction and to a flow path passing through a space between the inner peripheral surface of the sleeve 40 at the other side and the outer peripheral surface of the inflator 20. In addition, as for the flow path to one side in the cylinder axis direction, the flow path is squeezed by the squeezing portion 40*a* and the flowing amount thereof can be adjusted. The flow path of the gas is distributed in such a manner as described above, and a construction, in which the flowing amount is adjusted by squeezing the flow path of one side thereof, can be obtained with a simple construction.

Further, in the present embodiment, specifically, by passing the bolt 44 for fixing the inflator 20 to the casing 18 through the hole 48 of the tongue piece portion 40*b*, the sleeve 40 is engaged with the inflator 20 and is enabled to be installed thereupon. Therefore, there is no need to separately provide a fixing member for fixing the sleeve 40 to the casing 18, and a fixing structure can be simply formed. Furthermore, there is no need to provide a fixing member for the sleeve 40. Therefore, a construction capable of adjusting the flowing amount of the gas to each of the chambers can be formed by later attaching the sleeve to an existing side airbag apparatus which is not equipped with a flowing amount adjusting device.

Moreover, in the present embodiment, specifically, a heat cloth 56 is provided at the outer periphery side of the sleeve 40. Therefore, an outer periphery side of the squeezing portion 40*a* of the sleeve 40 can be covered with the heat cloth 56. Therefore, the high-temperature gas, blown out from the inflator 20 passing through the squeezing portion 40*a* of the sleeve 40 toward the periphery, is avoided to directly blow the first and second panels 22A and 22B constituting the side airbag 16, and a deterioration of the base cloth due to the high-temperature gas can be reduced.

Hereinbelow, a second embodiment of the present invention will be explained with reference to the drawings. In this embodiment, clips 46 for supporting the inflator 20 are arranged in two positions, and a hooking portion 41*a* as a stopper is provided in a tongue piece portion 41 at an end portion of the other side in the cylinder axis direction thereof.

Figure 7A:
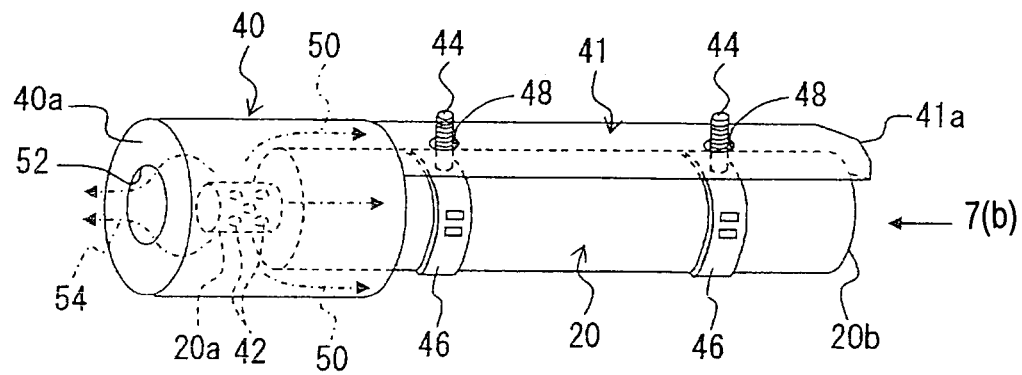
FIGS. 7(a) and 7(b) are a perspective view illustrating an entire structure of a sleeve provided in an inflator and a view looking from a direction of an arrow 7(b) in FIG. 7(a), respectively, according to a second embodiment of the present invention.
Figure 7B:
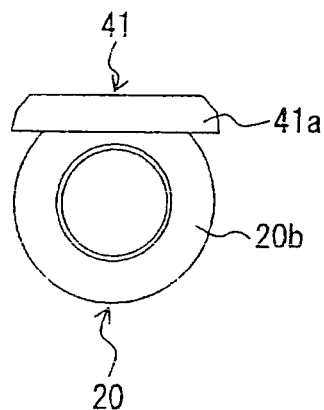

FIGS. 7(*a*) and 7(*b*) are views illustrating an entire structure of the sleeve 40. FIG. 7(*a*) is a perspective view thereof, and FIG. 7(*b*) is a view looking from a direction of an arrow 7(*b*) in FIG. 7(*a*).

In FIGS. 7(*a*) and 7(*b*), different from the first embodiment, a hole 48 is provided in two positions in the tongue piece portion 41 of the sleeve 40, respectively, i.e. at one side (left side in FIG. 7(*a*)) and the other side (right side in FIG. 7(*a*)) in a cylinder axis direction thereof, for passing the bolts 44 of the clips 46, which are provided in the two positions of the inflator in the axial direction thereof. By the bolts 44 passing through the holes 48, the sleeve 40 is engaged with the inflator 20 in a condition of covering one side (left side in FIG. 7(*a*), i.e., second chamber 28B side) of the inflator 20.

Further, the tongue piece portion 41 includes the hooking portion 41*a* at the end portion of the other side in the cylinder axis direction. The hooking portion 41*a* is, as shown in FIG. 7(*b*), provided to face the end portion 20*b* of the other side of the inflator 20 (being slightly spaced apart) in a manner so as to cover part of the end portion 20*b*, and is configured to have a structure capable of contacting the end portion 20*b* of the other side when the gas of the inflator 20 is blown out. Therefore, the sleeve 40 can be hooked to the inflator 20, and the sleeve 40 can be prevented from being dropped off or displaced from the inflator 20 due to propulsion during the operation of the airbag. As a result, an adjusting function of the sleeve 40 for the flowing amount of the gas can be stabilized.

Further, by providing the hooking portion 41*a*, an effect for improving strength of the sleeve 40 (specifically, the tongue portion 41) can be obtained. Incidentally, in the above-described structure, although the hooking portion 41*a* is provided to slightly space from the end portion 20*b* of the other side of the inflator 20, and configured to have a structure to contact the end portion 20*b* of the other side when the gas of the inflator 20 is blown out, the hooking portion 41*a* may have a structure to contact the end portion 20*b* of the other side of the inflator 20 before the gas is blown out.

The heat cloth 56, described above and shown in FIGS. 4(*a*) and 4(*b*), can be attached to the sleeve 40 of the present embodiment of the aforementioned construction, and the similar advantage can be obtained (the description is omitted). Further, the construction of the other components of the side airbag apparatus 14 of the present embodiment other than the sleeve 40 is similar to that of the first embodiment, and the description is omitted.

According to the side airbag apparatus 14 of the present embodiment of a construction explained above, the following advantage can be obtained besides the advantage similar to that of the first embodiment. The tongue piece portion 41 of the present embodiment includes a hooking portion 41*a*. The hooking portion 41*a* is provided at an end portion of the other side in the cylinder axis direction thereof to face the end portion 20*b* of the other side of the inflator 20 and cover the part of the end portion 20*b* thereof, and is capable of contacting the end portion 20*b* of the other side when the gas of the inflator 20 is blown out. Therefore, the sleeve 40 can be hooked on the inflator 20, and the sleeve 40 can be prevented from being dropped off or displaced from the inflator 20 due to propulsion during the operation of the airbag. As a result, the adjusting function of the sleeve 40 for adjusting the flowing amount of the gas can be stabilized. Further, by providing the hooking portion 41*a*, improvement of the strength of the sleeve 40 (specifically, the tongue portion 41) can be obtained.

Figure 8:
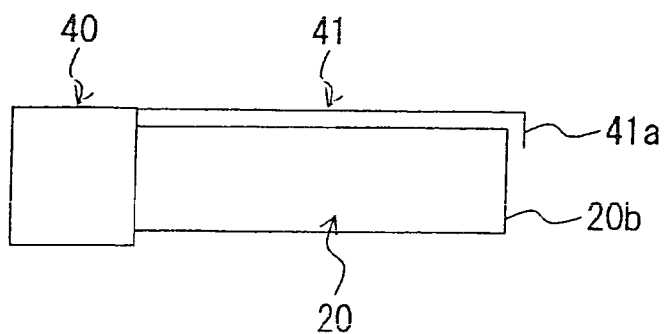
FIG. 8 is a conceptual side view illustrating the construction of the sleeve and inflator.
Figure 9:
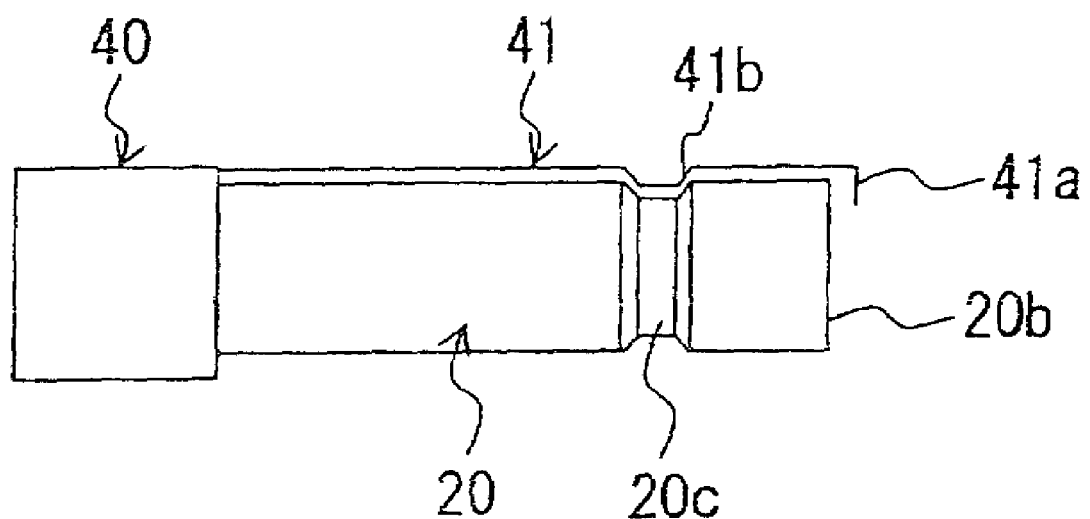
FIG. 9 is a conceptual side view of the sleeve and inflator illustrating a variation of a shape of a tongue piece portion of the sleeve.

In the second embodiment, as shown in FIG. 8, a conceptual drawing of the construction of the sleeve 40 and the inflator 20 in FIGS. 7(*a*) and 7(*b*), the present embodiment is constructed such that the hooking portion 41*a* is provided at the end portion of the other side in the axis direction of the tongue piece portion 41 (right side in FIG. 8), the hooking portion 41*a* contacts the end portion 20*b* of the other side of the inflator 20, and the sleeve 40 is thereby prevented from being dropped off or displaced from the inflator 20 due to the propulsion during the operation of the airbag. However, the present invention is not limited thereto. Namely, for example, as shown in FIG. 9, in a case where the inflator 20 has a shape including a concave portion 20*c*, the construction may be formed such that a concave portion 41*b*, corresponding to the concave portion 20*c*, is provided in the tongue piece portion 41, and that the concave portion 41*b* fits onto the concave portion 20*c* of the inflator 20.

Incidentally, in the first and second embodiments, although the sleeve 40 is formed to have a circular cylinder shape, the present invention is not limited thereto, as long as a cylindrical member is capable of covering one side in the longitudinal direction of the inflator 20, for example, a polygonal shape such as a quadrangle shape or the like in cross-section of a cylindrical member may be applicable. Similarly, although the squeezing portion 40*a* is formed to have a ring shape, the present invention is not limited thereto, and for example, a ring-shaped member whose opening shape is formed to be a polygonal shape such as a quadrangle shape or the like may be employed.

Further, in the above-described embodiments, although an explanation is made to illustrate the side airbag constructed with two bag portions by partitioning the inside of the airbag into two chambers, the present invention is not limited to the above-described. Namely, for example, the present invention may be applied to a side airbag constructed with three bag portions or more by partitioning an inside of an airbag into three chambers or more.

Furthermore, in the above-described, as described above, although the side airbag 16 is constructed by stitching and joining the first panel 22A and the second panel 22B, the present invention is not limited thereto. For example, the side airbag 16 may be constructed by joining the first panel 22A and the second panel 22B, using other joining devices such as, hollow weave or the like.

Moreover, in the above-described embodiments, although an explanation is made for a case, where the present invention is applied to a so-called seat-mount type side airbag apparatus that is mounted in the seat back 10B of the seat 10, as an example, the present invention is not limited thereto. The present invention may be applied to, for example, a so-called door-mount type side airbag apparatus that is mounted on an automobile door.

The disclosures of Japanese Patent Applications No. 2006-161746 filed on Jun. 12, 2006 and No. 2007-125458 filed on May 10, 2007 are incorporated as a reference.

While the invention has been explained with reference to the specific embodiments of the invention, the explanation is illustrative and the invention is limited only by the appended claims.

What is claimed is:

1. A side airbag apparatus comprising:
   a side airbag including a plurality of partitioned chambers therein, adapted to be inflated and deployed in a space between a side wall portion of a motor vehicle and an occupant seated on a seat disposed inside the motor vehicle;

an inflator having an approximately cylindrical shape, and including a gas ejecting portion formed only at one side in a longitudinal direction thereof and an inflator attaching portion adapted to attach the inflator to the motor vehicle, said inflator blowing gas for inflating and deploying the side airbag from one side in the longitudinal direction of the inflator; and a sleeve including a cylindrical member disposed to only cover the gas ejecting portion of the inflator and having a squeezing portion for squeezing a flow path of the gas blown out from the inflator, and a tongue piece projecting from the cylindrical member in a direction opposite to the squeezing portion, said tongue piece engaging the inflator attaching portion, wherein the squeezing portion is a ring-shaped member, provided at an end portion of one side in an axis direction of the cylindrical member, the cylindrical member has an inner diameter greater than an outer diameter of the inflator at a predetermined value so that a flow path of the gas is formed in a space between an inner peripheral surface of the cylindrical member and an outer peripheral surface of the inflator, and the tongue piece extends to an end portion of the other side in the longitudinal direction of the inflator, and includes a hooking portion capable of contacting the end portion of the other side of the inflator when the gas of the inflator is blown out.

2. The side airbag apparatus according to claim 1, wherein the cylindrical member is made of solid material.

3. The side airbag apparatus according to claim 1, further comprising a cylindrically shaped base cloth provided at an outer periphery side of the cylindrical member.

4. The side airbag apparatus according to claim 1, wherein the side airbag has a bag shape and is formed of at least two sheets of base cloths stitched together; and the side airbag comprises a fitting portion therein to fit on the cylindrical member, the fitting portion forming a passageway so that an inner diameter of the fitting portion is approximately equal to an outer diameter of the cylindrical member by stitching.

5. The side airbag apparatus according to claim 4, wherein the side airbag comprises a circular-ring shaped stitching portion where the base cloth is stitched into approximately circular-ring shape at least at one side of the fitting portion.

6. A motor vehicle seat comprising a seat back portion, the side airbag apparatus according to claim 1 installed in the seat back portion.

7. The side airbag apparatus according to claim 1, wherein said inflator attaching portion comprises a clip and a bolt projecting outwardly from the clip, said tongue piece having a rectangular shape with a hole engaging the bolt.

8. The side airbag apparatus according to claim 7, wherein said inflator attaching portion comprises two sets of the clip and the bolt spaced apart from each other along the longitudinal direction of the inflator, said tongue piece having two holes engaging the bolts.

9. A gas distributor for an inflator for distributing gas to an airbag, comprising a cylindrical member having a squeezing portion for restriction of a flow path of the gas blown from the inflator, the cylindrical member covering only one side in a longitudinal direction of the inflator, and a tongue piece projecting from the cylindrical member in a direction opposite to the squeezing portion, said tongue piece being adapted to engage an inflator attaching portion, wherein the cylindrical member further comprises an engaging portion for engaging the inflator, and the engaging portion faces an end portion of the other side in the longitudinal direction of the inflator, and includes a hooking portion capable of contacting the end portion of the other side in the longitudinal direction of the inflator when the gas of the inflator is blown out.

10. The gas distributor according to claim 9, wherein the tongue piece projecting from the cylindrical member has the engaging portion, said gas distributor being made of a solid material.

11. A side airbag apparatus comprising:

a side airbag including a plurality of partitioned chambers therein, adapted to be inflated and deployed in a space between a side wall portion of a motor vehicle and an occupant seated on a seat disposed inside the motor vehicle;

an inflator having an approximately cylindrical shape, and including a gas ejecting portion formed only at one side in a longitudinal direction thereof and an inflator attaching portion adapted to attach the inflator to the motor vehicle, said inflator blowing gas for inflating and deploying the side airbag from one side in the longitudinal direction of the inflator; and a sleeve including a cylindrical member disposed to only cover the gas ejecting portion of the inflator and having a squeezing portion for squeezing a flow path of the gas blown out from the inflator, and a tongue piece projecting from the cylindrical member in a direction opposite to the squeezing portion, said tongue piece engaging the inflator attaching portion, wherein said inflator includes a concave portion, and said tongue piece includes a concave portion fitting onto the concave portion of the inflator.

* * * * *